United States Patent [19]

Thaler

[11] 4,151,113

[45] Apr. 24, 1979

[54] HALOGENATED ORGANOALUMINUM COMPOUNDS AND METHOD OF PREPARATION

[75] Inventor: Warren A. Thaler, Matawan, N.J.

[73] Assignee: Exxon Research & Engineering Co., Florham Park, N.J.

[21] Appl. No.: 828,610

[22] Filed: Aug. 29, 1977

Related U.S. Application Data

[63] Continuation-in-part of Ser. No. 635,695, Nov. 26, 1975, abandoned.

[51] Int. Cl.² .................................................. C08F 4/52
[52] U.S. Cl. .............................. 252/429 R; 252/431 R; 526/137; 526/159
[58] Field of Search ........................ 252/429 R, 431 R

[56] References Cited

U.S. PATENT DOCUMENTS

| | | | |
|---|---|---|---|
| 3,450,797 | 6/1969 | Schafer et al. | 252/429 R X |
| 4,029,866 | 6/1977 | Kennedy | 252/431 R X |

FOREIGN PATENT DOCUMENTS

| | | | |
|---|---|---|---|
| 1269825 | 7/1961 | France | 252/431 R |
| 1362295 | 8/1974 | United Kingdom. | |

*Primary Examiner*—Patrick Garvin
*Attorney, Agent, or Firm*—Richard E. Nanfeldt

[57] ABSTRACT

Novel halogenated organoaluminum catalysts are prepared by prereacting a material of the formula:

$$R_m AlX_{3-m}$$

wherein m is an integer of from 1 to 3 inclusive, R is the same or different alkyl radical of straight or branched chain structure of from 1 to 7 carbons and X is the same or different halogen selected from the group consisting of chlorine and bromine with Y moles of halogen or mixed halogen per mole of aluminum compound wherein the halogen is selected from the group consisting of chlorine and bromine such that (m-Y) is from less than 0.7 to about 0.2. The materials must be prepared sufficiently prior to use to insure extensive reaction of the components to yield an effective polymerization catalyst. Preferably, the components are prereacted for at least 2 minutes, more preferably at least 10 minutes, most preferably at least 4 hours, i.e. (overnight). The catalyst is prepared at any temperature insuring liquid conditions, i.e., −100→+100° C. depending on the components selected for reaction, ambient temperature being most convenient.

The compounds are useful as hydrocarbon soluble catalysts and are prepared sufficiently in advance of use to insure complete reaction between the two components yielding the reactive entity. The novel soluble catalysts frequently exhibit higher catalytic activity and efficiency than those of the prior art. They permit polymerization reactions to be run which yield higher molecular weight polymers and copolymers at higher temperatures. The catalysts of the instant invention are particularly useful in the synthesis of highly unsaturated isoolefin multiolefin copolymers of high molecular weight.

25 Claims, 4 Drawing Figures

HIGH $\bar{M}_n$'S AT WARMER POLYMERIZATION TEMPERATURES

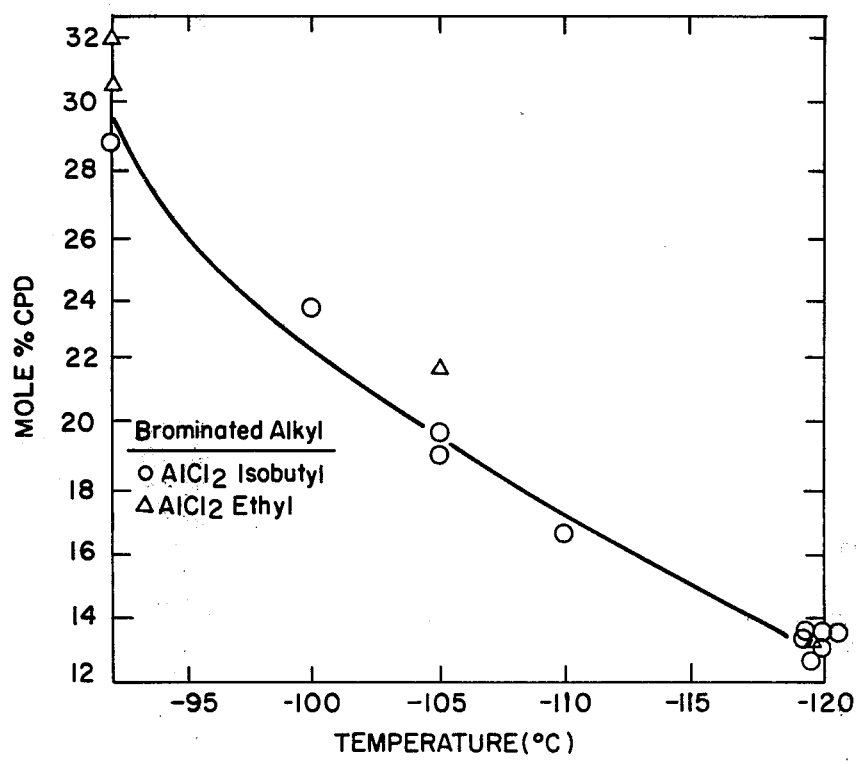
Figure II
UNSATURATION VS. TEMPERATURE D5 COPOLYMERIZATION

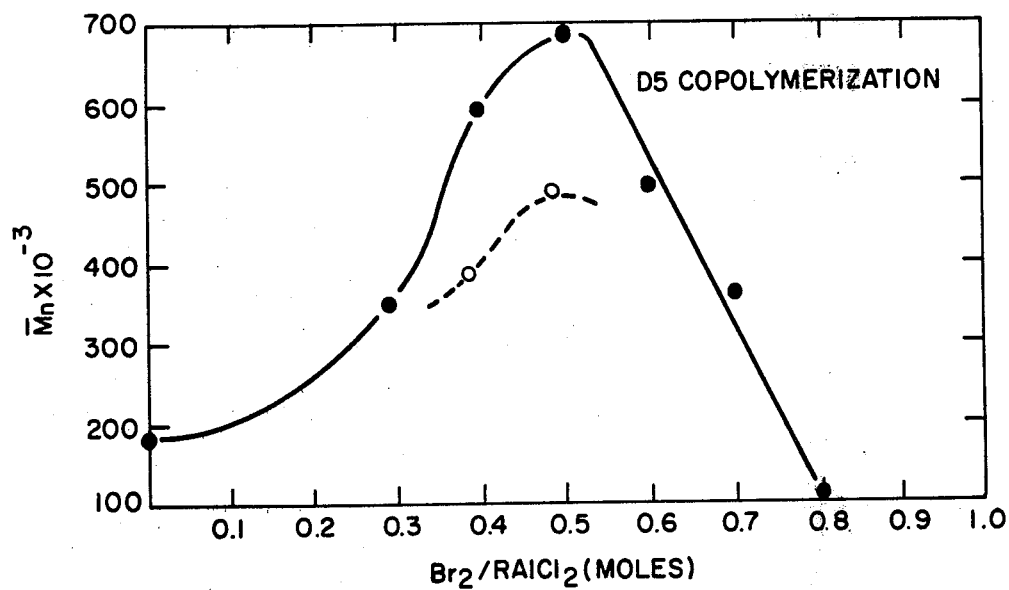

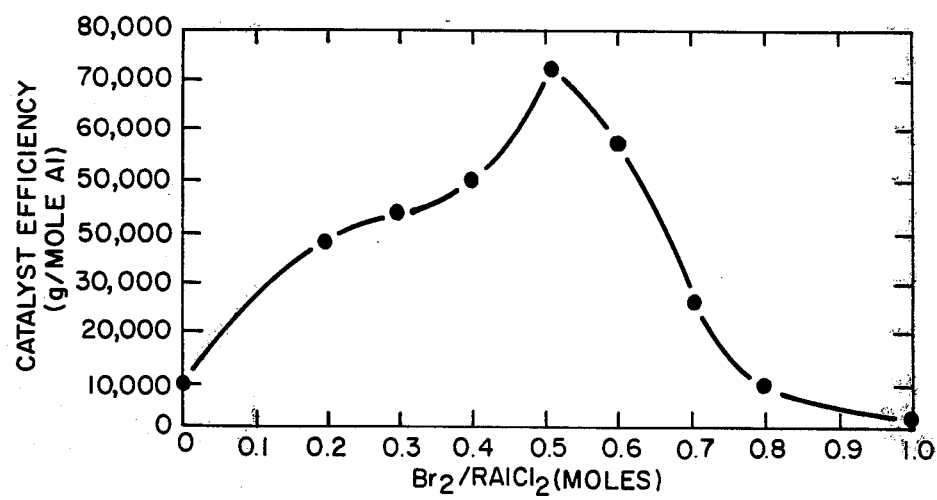
Figure IV
CATALYST EFFICIENCY vs. $Br_2/RAlCl_2$ RATIO

HALOGENATED ORGANOALUMINUM COMPOUNDS AND METHOD OF PREPARATION

CROSS REFERENCE TO RELATED APPLICATIONS

The present application is a continuation-in-part application of Ser. No. 635,695 filed on Nov. 26, 1975, now abandoned.

BACKGROUND OF THE INVENTION

1. Field of the Invention

Novel halogenated organoaluminum catalysts are prepared by prereacting a material of the formula:

$$R_mAlX_{3-m}$$

wherein m is an integer of from 1 to 3 inclusive, R is the same or different alkyl radical of straight or branched chain structure of from 1 to 7 carbons and X is the same or different halogen selected from the group consisting of chlorine and bromine with Y moles of halogen or mixed halogen per mole of aluminum compound wherein the halogen is selected from the group consisting of chlorine and bromine such that (m-Y) is less than 0.7 to about 0.2. The materials must be prepared sufficiently prior to use to insure extensive reaction of the components to yield an effective polymerization catalyst. Preferably, the components are prereacted for at least 2 minutes, more preferably at least 10 minutes, most preferably at least 4 hours, i.e. (overnight). The catalyst is prepared at any temperature insuring liquid conditions, i.e., $-100°\rightarrow+100°$ C. depending on the components selected for reaction, ambient temperature being most convenient.

The compounds are useful as hydrocarbon soluble catalysts and are prepared sufficiently in advance of use to insure complete reaction between the two components yielding the reactive entity. The novel soluble catalysts frequently exhibit higher catalytic activity and efficiency than those of the prior art. They permit polymerization reactions to be run which yield higher molecular weight polymers and copolymers at higher temperatures. The catalysts of the instant invention are particularly useful in the synthesis of highly unsaturated isoolefin multiolefin copolymers of high molecular weight.

2. Description of the Prior Art

Aluminum compounds are widely used as polymerization catalysts. Aluminum chloride is commonly used to initiate cationic polymerizations but it has the disadvantage of little or no solubility in many desirable hydrocarbon systems especially where homogeneous polymerizations are required. Aluminum bromide which is soluble in hydrocarbons, has limited utility as such in a number of desirable systems. Alkylaluminum dihalides are generally less reactive than the aluminum halides but offer the advantage of excellent hydrocarbon solubility. To enhance their reactivity, they are frequently used together with cocatalysts. Proton donators like the halogen acids, are placed in the polymerization medium and are said to be ionized by the aluminum compound thereby releasing protons to initiate polymerization. Halogens and organic halogen compounds are also ionized in situ to initiate cationic polymerization. In the case of dialkylaluminum halides and aluminum alkyls, such cocatalysts are required since these compounds are not generally active in themselves. Also compounds like dialkylaluminum iodides and alkylaluminum diodides, which are generally not effective initiators in and of themselves, have been utilized with halogen cocatalysts, such as iodine, to initiate the polymerization. The iodine must be present in the polymerization medium and is ionized by the aluminum component, the ions initiating the polymerization. This is a good illustration of cocatalysis since neither the starting alkylaluminum iodides nor the product aluminum iodide is a catalyst by itself so the cocatalyst must be present in the polymerization medium.

The catalyst systems of the instant invention differ markedly from those of the prior art. The halogens, and interhalogen compounds are not used as cocatalysts but instead are prereacted with the organic aluminum compound to generate novel catalyst species which are hydrocarbon soluble and can be utilized in hydrocarbon polymerization systems. These catalysts are generally more reactive and give higher molecular weights than the corresponding organoaluminum compounds from which they are derived. Furthermore, the prereacted catalysts of the instant invention give products superior to the polymerization products obtained using halogens or interhalogen compounds as cocatalysts.

Numerous prior art examples using cocatalysts are extant. These are clearly distinguishable from the catalysts of the instant invention. The halides, etc. of the prior art are used either in situ as cocatalysts or as complexing agents.

U.S. Pat. No. 2,220,930 teaches the manufacture of polymers using catalysts such as dialkylaluminum halides or alkylaluminum halides, generally represented as $MX_mR_n$ where M represents aluminum, gallium or boron, X represents halogen, R represents a monovalent hydrocarbon radical, m or n represent integers 1 to 2 1 inclusive, and m+n=3. The catalyst can also be a complex of the above compounds with inorganic halides (e.g. NaCl) or with ammonia or amines. In practice, U.S. Pat. No. 2,220,930 utilized either dialkylaluminum halides or alkylaluminum dihalides alone or in a mixture of equal parts which is commonly known as the sesquihalide. The polymers of isobutylenes obtained were low molecular weight resins.

U.S. Pat. No. 2,387,517 relates to the manufacture of polymers prepared by the copolymerization of various unsaturated compounds in the presence of catalysts of the type $MX_mR_n$ where M represents aluminum, gallium or boron, X represents a halogen, R represents a monovalent hydrocarbon radical, m or n represent integers from 1 to 2 inclusive and m+n=3. The invention is particularly directed to the formation of curable rubber-like products by the copolymerization of isobutylene with low molecular weight diolefins, especially those having 4 to 6 carbon atoms. The products are described as ranging in molecular weight from 1000 to 3000 up to 300,000 or higher. However, the type of molecular weight is not indicated (i.e. number average, weight average) nor is an actual polymer approaching 300,000 molecular weight prepared. The composition used as catalysts in the above two related cases are not prepared by prereacting an alkyl aluminum halide with halogens, halogen acid or interhalogen compounds of the instant invention and do not suggest the superiority which the instant compositions demonstrate as catalysts.

U.S. Pat. No. 2,388,428 relates to an improved method for effecting organic chemical reactions by generating Friedel-Crafts metal halide catalysts in situ. It teaches dissolving an organo aluminum compound in a hydrocarbon reactant being charged to the process and contacting said solution with an excess of hydrogen halide in a reaction zone under hydrocarbon conversion conditions whereby an aluminum halide catalyst is generated in situ and the conversion reaction is effected. The hydrogen halide is added in excess (in an excess over the amount required to completely convert the organoaluminum compound to the aluminum halide so as to generate aluminum halide (e.g. $AlCl_3$) in situ). Such generation of aluminum chloride is described as being subject to greater control and of greater precision than prior art methods of dissolving or suspending the aluminum halide in the reaction mixture. Particular note should be taken of the fact that the catalyst components are not prereacted and then added to the reaction zone, but are reacted in situ. Furthermore, the stoichiometry is quite different from the catalysts of the instant invention. The use of the catalyst of U.S. Pat. No. 2,388,428 for the purposes of polymerization is not taught as the examples are directed solely to isomerization and alkylation.

U.S. Pat. No. 3,349,065 teaches an improved catalyst system for producing high molecular weight butyl rubbers. The catalyst system comprises a dialkylaluminum halide together with a small but critical amount of an anhydrous hydrogen halide as a promoter (cocatalyst). The amount of anhydrous hydrogen halides used ranges from 0.001 mole to 0.05 mole promoter per mole of dialkylaluminum monohalide. The maximum desirable ratio is 0.05 mole promoter per mole of catalyst. This is clearly outside the range of the catalyst of the instant invention. Furthermore, the hydrogen halide is added to a solution containing both the dialkylaluminum chloride and monomer and is not prereacted with said organoaluminum compound as in the method of the instant invention.

U.S. Pat. No. 3,562,804 also describes the use of an organoaluminum compound in conjunction with hydrogen chloride or a $C_3$-$C_7$ organic halide compound as promoter to produce low viscosity mastic compositions. Here again, the catalyst and promoter were combined in the presence of monomer and all examples teach the separate addition of catalyst and promoter to the polymerization (monomer) mixture.

U.S. Pat. No. 3,850,897 teaches a procedure of the production of polymers and copolymers of isobutylene. The catalyst disclosed is of the general formula RAl(YR')X where Y is an oxygen or sulfur atom together with a wide variety of promoters. The aluminum compounds disclosed in this patent are different from those of the instant invention. Furthermore, the patent in question teaches the necessity of combining catalyst and cocatalyst in the presence of monomers. Stepwise addition of catalyst and cocatalyst to the polymerization medium is demonstrated in the examples.

U.S. Pat. No. 3,835,079 teaches hot melt compositions comprising styrene, isobutylene copolymer wax and a primary resin. The catalysts employed a system utilizing a primary component alkylaluminum dihalide with a promoter (cocatalyst) such as hydrogen halide. The maximum cocatalyst is 30 mole percent of the primary catalyst. A more limited range, 2.5 to 15 is preferred or 5 to 10% with cocatalysts such as water. The range of compositions is clearly outside that of the instant invention. Furthermore, the promoters are stated to be cocatalysts in this patent while they are consumed in a prior reaction in the instant invention and are not available to serve as cocatalysts.

U.S. Pat. No. 3,560,458 teaches a polymerization process utilizing a catalyst of the type $Al(M)_2R$ where M is an alkyl group and R is alkyl, hydrogen or halogen. It is obvious that the catalyst intended for use is the alkyl or the monohalide. Experimental procedure reveals a stepwise addition of cocatalyst promoters to a solution containing catalyst in the cationically polymerizable monomer.

British Pat. No. 1,362,295 teaches a catalyst suitable for use in the polymerization of unsaturated compounds and a process for employing such a catalyst. The catalyst used is a two-component substance, the primary component being $R_2AlX$ wherein R is a hydrocarbon or hydrogen radical, X can be hydrocarbon, hydrogen or halogen. The secondary component is represented as YZ wherein each of Y and Z are the same or different halogen. The component can be present in a ratio of primary to secondary of from 0.1:1 to 1000:1.

U.S. Pat. No. 3,757,000 to Scardiglia teaches the use of ethyl aluminum dichloride as catalyst mixed with a cocatalyst selected from the group of water, alcohols, alkyl halides and HCl which is non-applicable to the instant application.

DESCRIPTION OF FIGURES

FIG. I represents the number average molecular weight of polymer obtained by use of the instant catalyst and the temperature at which said polymers are formed.

FIG. II represents the degree of unsaturation incorporated into a polymer at various temperatures.

Figure 1:
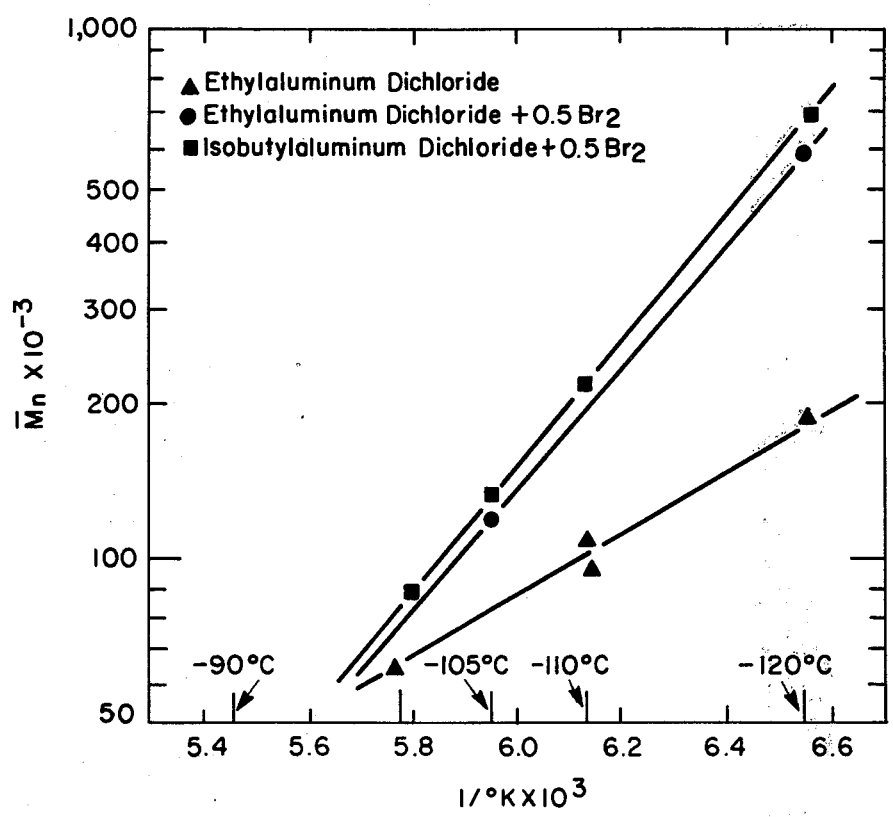

FIG. III represents the number average molecular weight of polymers which is obtained at various catalyst composition ratios and also shows the benefit of aging the catalyst composition.

FIG. IV represents a plot of catalyst efficiency.

THE INSTANT INVENTION

Novel halogenated organoaluminum catalysts are prepared by mixing material of the formula $R_mAlX_{3-m}$ wherein m is from 1 to 3, R is an alkyl radical of straight or branched chain structure of from 1 to 7 carbons and X is the same or different halogen selected from the group consisting of chlorine and bromine with Y moles of a halogen, or mixed halogen per mole of aluminum compound wherein the halogen is selected from the group consisting of chlorine and bromine, the quantity Y being selected such that (m-Y) is from less than 0.7 to about 0.2, preferably from 0.6 to 0.4.

In a more particular embodiment, novel organoaluminum catalysts are prepared by mixing material of the formula $RAlX_2$ wherein R is an alkyl radical of straight or branched chain structure of from 1 to 7 carbons and X is the same or different halogen selected from the group consisting of chlorine and bromine with from more than 0.3 to about 0.8 moles/mole $RAlX_2$, preferably 0.4 to 0.6 moles/mole $RAlX_2$ of a halogen, or a mixed halogen.

In an alternative embodiment, the novel catalysts are prepared by mixing materials of the formula $R_2AlX$ wherein R is the same or different alkyl radical of straight or branched chain structure of from 1–7 carbons and X is a halogen selected from the group consisting of chlorine and bromine with from more than 1.3 to about 1.8, preferably 1.4 to 1.6 moles of a halogen, or a mixed halogen per mole of dialkyl aluminum monohalide wherein the halogen is selected from the group consisting of chlorine and bromine.

In yet another embodiment, the novel catalysts are prepared by mixing, before use, materials of the formula $R_3Al$, wherein R is the same or different alkyl radical of straight or branched chain structure of from 1-7 carbons with from more than 2.3 to about 2.8, preferably 2.4 to 2.6 moles of halogen or a mixed halogen per mole of trialkyl aluminum compound, wherein the halogen is selected from the group consisting of chlorine and bromine.

The catalyst preparation is preferably carried out in a solvent, more preferably in a hydrocarbon solvent, most preferably in a paraffinic hydrocarbon liquid or mixtures thereof, of from 1 to 10 carbons which may be normal, branched or cyclic in structure. The concentration of aluminum compound is from about 0.01 to 20%, preferably 0.2 to about 10%. The temperature of the reaction may range from $-100°$ to $+100°$ C., providing the solvent remains liquid and the formed catalyst remains soluble.

The formed compounds are useful as catalysts, are hydrocarbon soluble and are prepared sufficiently in advance of use to insure reaction between the two components yielding the reactive entity. The components are premixed before use, the premixing occurring preferably from about 2 minutes, more preferably 10 minutes and most preferably 4 hours before use. The mixture may even be prereacted and left overnight before use. Heating will reduce the period of time by which the premixing, to yield an active catalyst, must occur before use. The reactive entity thus prepared, exhibits higher catalytic activity and efficacy than catalysts of the prior art and permits polymerization reactions to be run which yield higher molecular weight polymers and copolymers at higher temperature and/or the inclusion of a greater degree of unsaturation in a polymer of either high or low molecular weight at temperatures higher than previously possible.

The compounds of this invention are particularly beneficial for homogeneous cationic polymerization in hydrocarbon media since they are more reactive than alkylaluminum dichlorides or dibromides alone. They also avoid difficulties associated with using hydrocarbon insoluble catalysts such as $AlCl_3$ since hydrocarbon slurries of the latter frequently cause gelation or fouling, while using polar solvent (i.e. methyl chloride) solutions of the latter catalyst require counteracting the effects of the polar catalyst solvent which is a nonsolvent for the polymer and require diluting the monomer with additional quantities of polymer solvent to maintain homogeneous polymerization conditions.

The catalysts of this invention offer further benefits in that they frequently give higher molecular weight polymers and copolymers than the generally available organoaluminum compounds from which they are conveniently and inexpensively prepared. The formation of polymers of higher molecular weights with the novel hydrocarbon soluble catalysts of this invention frequently permits operation at warmer polymerization temperatures while yielding equivalently high mole wt. polymers (see FIG. I). Since polymer molecular weights generally decrease with increasing temperature in prior art cationic polymerizations, the ability of the instant invention to yield high molecular wt. polymers at higher temperature is a marked advance over the prior art. Since polymerizations are generally quite exothermic and frequently carried out at low temperatures, process limitations relating to solution viscosity, heat transfer rates, maximum solids contents and ultimately production capacity for a given size unit are encountered. Thus, it is beneficial and industrially quite valuable if the desired molecular weights can be attained at warmer polymerization temperatures. The present invention features these characteristics and advantages.

The catalysts of this invention are particularly valuable since they not only give higher catalyst efficiencies but they also produce higher molecular weight polymers, copolymers at warmer temperatures than conventional catalysts.

An object of this invention is the preparation of novel hydrocarbon soluble catalysts. Another object of this invention is the utilization of these catalysts in improved processes with polymerizable monomers especially cationically polymerizable monomers. One group of cationically polymerizable monomers suitable for use with the novel catalysts of the instant invention are cationically polymerizable unsaturated compounds, especially unsaturated hydrocarbons. Particularly valuable polymers can be prepared from isoolefins, of from 4 to 20 carbons, multiolefins of from 5 to 20 carbons, or mixtures thereof to produce homopolymers and copolymers. Examples of such unsaturated hydrocarbons include but are not restricted to isobutylene, 2-methylbutene, 3-methylbutene-1, 4-methylpentene-1, and β-pinene. Multiolefins include but are not limited to butadiene, isoprene, piperylene, 2,3-dimethylbutadiene, cyclopentadiene, 1,3-cyclohexadiene, dimethylfulvene and divinylbenzene.

The hydrocarbon soluble compounds of this invention are prepared by reacting in an inert solvent, preferably a hydrocarbon solvent, more preferably a paraffinic hydrocarbon solvent, most preferably a paraffinic solvent $C_1-C_{10}$, a hydrocarbyl aluminum halide compound together with a halogen or interhalogen. The hydrocarbyl aluminum compound has the general formula $R_mAlX_{3-m}$ wherein R is a hydrocarbyl group, preferably an alkyl group up to $C_7$, most preferably a $C_1$ to $C_4$ alkyl group and X is a halogen or mixture of halogens, preferably chlorine or bromine, most preferably chlorine and m is 1-3 inclusive. Preferably, the hydrocarbyl aluminum halide compound has m=1. Most preferably, the hydrocarbyl aluminum halide compound is an alkyl aluminum dichloride.

The quantity of halogen or mixed halogen which must be prereacted with the hydrocarbyl aluminum compound to obtain the desired hydrocarbon soluble catalyst is determined by the value of m in the hydrocarbyl aluminum compound. Thus the number of moles of halogen, or interhalogen compound (Y) (per mole aluminum compound) introduced is such that $(m-Y)=\pm 0.7$ to 0.2, i.e. depending on the value of m, Y ranges from $>0.3$ to about 0.8; $>1.3$ to about 1.8 or $>2.3$ to about 2.8, the preferred ranges being 0.4 to 0.6, 1.4 to 1.6, 2.4 to 2.6. Preferably, the ratio is such that $(m-Y)=0.6$ to 0.4. In situations utilizing mixed halide catalyst compositions, the ratio of bromine to chlorine may range from 0.1:1 to 10:1.

For example, in the case of $R_mAlX_{3-m}$ where m=1 and X is chlorine ($RAlCl_2$), the hydrocarbyl aluminum dihalide may be reacted with chlorine, bromine, or bromine chloride reagents such that from $>0.3:1$ to about 0.8:1 moles of reagent are added per mole of hydrocarbylaluminum dichloride. Preferably, 0.4:1 to 0.6:1 ratio of reagent to hydrocarbylaluminum dichloride are utilized. Said reaction is carried out in an inert medium preferably a hydrocarbon medium, most preferably a $C_1$–$C_{10}$ paraffinic hydrocarbon medium to form the hydrocarbon soluble catalyst. The two components are mixed at any temperature at which it is possible to maintain the components in liquid phase. Preferable ambient temperature is used. The components are preferably diluted in an inert paraffinic solvent such as butane, isobutane, pentane, isopentane, hexane, isomeric hexanes, cyclohexanes, methylcyclohexane or mixtures of paraffinic solvents are the solvents of choice for the polymerization so as to facilitate mixing and reaction. Low concentration of aromatic hydrocarbons are sometimes beneficial for stabilizing catalyst. The catalyst solution concentrations may range from 0.01 to 20%, preferably 0.2 to 10%, e.g. 1%.

Catalysts of the instant invention can be utilized without added cocatalysts but may also be utilized in conjunction with the usual cocatalysts which may be added intentionally or may be present as adventitious impurities.

It is a vital requirement of this invention that said aluminum compound be reacted with said halogen, or mixed halogen compound sufficiently prior to introducing the resultant catalyst solution into a polymerization feed containing monomers so as to insure reaction between the catalyst component species to form the reaction product which is hydrocarbon soluble catalyst. The components must be premixed, preferably at least 2 minutes, more preferably 10 minutes, most preferably 4 hours before use. The components can advantageously be premixed and left overnight for use the next day without adverse effects. The halogen or mixed halogen compound may be admixed with a solution of hydrocarbylaluminum dihalide either as neat liquids, gases or preferably in solution an inert solvent. Solvents such as paraffins are inert to halogens in the absence of free radical initiators and radiation, therefore, said solutions should be protected from light prior to the reaction with aluminum compound. Even where reaction with hydrocarbylaluminum dihalides is extremely rapid and the resulting catalyst solution can be used immediately, it is beneficial to age the catalyst for several hours prior to use. Catalyst solutions are stable for several days and some have been utilized for several weeks without detriment. The catalysts prepared by reaction of hydrocarbylaluminum dihalide with halogen or interhalogen compounds, it has been observed that the presence of very small amounts of aromatic hydrocarbons from 1 to 10 ppm concentrations in the catalyst solvent are helpful in prolonging the useful life of the catalyst solution. However, regardless of the overall shelf life of the premixed system, it is absolutely essential that the components be premixed prior to use.

One embodiment of this invention is the utilization of said novel catalysts in improved processes for the preparation of isoolefin homopolymers and copolymers of an isoolefin with multiolefins or mixtures of multiolefins. These catalysts have been found to be surprisingly useful for the production of valuable highly unsaturated high molecular weight copolymer of isobutylene with conjugated diolefin(s). Some of the characteristics of these processes are higher catalyst efficiencies and higher polymer molecular weights than are realized with ordinary hydrocarbyl-aluminum dihalides. The novel catalysts of this invention are soluble in hydrocarbons even paraffinic hydrocarbons. They are active in an all hydrocarbon system of monomers and solvents (cosolvents) and frequently give greater efficiencies, more rapid polymerization, and higher molecular weights. Thus under a wider variety of conditions these catalysts achieve faster reactions and higher molecular weights at warmer temperatures than conventional hydrocarbyl aluminum dihalide catalysts. These catalysts are particularly valuable for the production of extraordinarily high molecular weight highly unsaturated copolymers of isobutylene and conjugated diolefins such as cyclopentadiene. As a consequence, highly unsaturated copolymers with number average molecular weights similar to those obtained with hydrocarbylaluminum dihalide can be produced at substantially warmer polymerization temperatures (FIG. I).

Some examples which follow will illustrate some aspects of the utility of these new catalysts. It is emphasized that these examples are illustrative and other applications will be obvious to those skilled in the art.

EXAMPLE 1

Experiments designed to demonstrate the advantage of modifying a hydrocarbylaluminum compound with a halogen as well as the preferred quantity of halogen were carried out in the following manner.

In an inert atmosphere 0.9765 g (0.0063 moles) isobutylaluminum dichloride was placed into each of 8 100 ml volumetric flasks and diluted with ~50 ml of methylcyclohexane. The first flask was diluted to 100 ml with methylcyclohexane. The remaining flasks were treated with 0.3, 0.4, 0.5, 0.6, 0.7, 0.8 and 1.0 g respectively, of bromine dissolved in 40 ml methylcyclohexane. The bromine color was discharged immediately on mixing. This series corresponds closely to molar ratio of bromine to hydrocarbylaluminum compound of 0:1, 0.3:1, 0.4:1, 0.5:1, 0.6:1, 0.7:1, 0.8:1 and 1:1. The flasks were diluted to the 100 ml mark such that all solutions were 0.063 M in aluminum compounds.

A polymerization feed consisting of 380 ml (at $-120°$ C.) isobutylene 20 ml (at $-78°$ C.) of cyclopentadiene and 100 ml of methylcyclohexane, was stirred at $-120°$ C. and 2 ml of catalyst solution was added. After 20 minutes the polymerization was terminated by the addition of a few drops of n-propylalcohol. The solution was then treated with ammonia to deactivate acidic catalyst residues and the copolymer product coagulated from 1 liter of hot methanol containing a small quantity of antioxidant. The copolymer was dried at 50° C. in vacuo. (FIG. III open circles shows the results of the experiment).

The above experiment was carried out shortly after catalyst preparation with 0.4:1 and 0.5:1 catalyst solutions. The experiment was repeated with all of the catalyst solutions after aging at least one day. One result demonstrating the value of the novel catalysts of this invention is shown in FIG. III (closed circles). In this FIGURE, the number average molecular-weight of the product is shown graphically as function of the ratio of the bromine reacted with the aluminum compound prior to initiating the polymerization.

FIG. III demonstrates that the number average molecular weight increases dramatically with an increasing molar ratio of bromine to hydrocarbylaluminum dichloride reaching a maximum at about 0.5:1 molar ratio and decreasing thereafter. These results are particularly significant in light of the fact that the polymeric products are highly unsaturated isobutylene copolymers incorporating substantial quantities of cyclopentadiene (13 mole % cyclopentadiene). Such high molecular weights are unprecedented and are substantially higher than those which could be achieved with unmodified hydrocarbylaluminum dichloride. The figure also dramatically highlights the surprising consequences of catalyst aging. An aged catalyst of the instant invention exhibits enhanced activity over and above the enhanced activity of the unaged catalyst as compared with catalysts of the prior art.

FIG. III (open circles) shows results with two of the catalysts which were not aged and indicates a benefit from aging.

Further benefits from the novel catalysts of this invention are demonstrated in FIG. IV in which the catalyst efficiencies (expressed as grams of polymer per mole of aluminum compound initiator) are displayed as a function of the ratio of bromine to hydrocarbylaluminum dichloride in the catalyst preparation. Here again the results show a marked benefit from the new catalysts with an optimum at about the 0.5:1 molar ratio. Thus the catalysts offer an ideal feature in that the catalyst gives optimum molecular weights and catalyst efficiencies at the same mole ratio concentrations.

EXAMPLE 2

According to the method of Example 1, catalyst solutions were prepared from 0.063 M solution of ethylaluminum dichloride and isobutylaluminum dichloride in a hydrocarbon solvent by treating each solution with one-half mole of bromine per mole of aluminum compound.

Polymerizations according to the general method of Example 1 were carried out with the polymerization feed described in this example at several temperatures and the results with these novel catalysts is compared in FIG. I with results using ethylaluminum dichloride catalyst solution alone.

Clearly the novel catalyst of this invention not only give higher molecular weight copolymers than unmodified alkylaluminum dichlorides but allow the beneficial operation at warmer temperatures to achieve a given desired molecular weight.

An added benefit from operation at warmer temperatures is the greater incorporation of a greater amount of cyclopentadiene into the polymer. The composition of the copolymer as function of polymerization temperature is shown in FIG. II for two novel catalysts of this invention prepared by appropriate modification of ethyl and isobutyl-aluminum dichlorides respectively, with one-half mole of bromine per mole of hydrocarbylaluminum dichloride.

The use of halogens, halogen acids, positive halogen compounds as well as readily ionizable organic halides as coiniators for cationic polymerization is known to those skilled in the art. These procedures frequently involve the use of an organoaluminum compound which preferably is not an initiator. Typical of such procedures is the addition of the organoaluminum compound to the monomers followed by the halide initiator.

The initiation in these reactions is the result of the ionization by the halide with the aid of the aluminum compound. This is represented as follows:

$$Et_2AlCl + Cl_2 \rightleftharpoons Cl^+ Et_2AlCl_2^- \qquad II$$

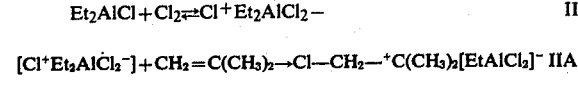

$$[Cl^+Et_2AlCl_2^-] + CH_2=C(CH_3)_2 \rightarrow Cl-CH_2-{}^+C(CH_3)_2[EtAlCl_2]^- \qquad IIA$$

Clearly the initiator (halogen, halogen acid, etc.) must be treated with the monomers in the presence of the aluminum co-initiator for polymerization to ensue. Another characteristic of such catalyst systems is the requirement of a very high ratio of aluminum compound to initiator (5:1 to 200:1). See for example Chim Ind. (Milan), 55 109 (1973).

Our novel catalysts are clearly distinguishable over halogen and catalysts using aluminum compound co-initiators. Most important, prior art reactions use the halogenonium ion as initiator which must be generated in the presence of monomer since such species are rapidly consumed by organoaluminum compounds and would not be available for initiation as represented by the following:

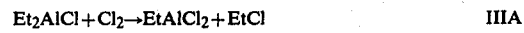

$$Et_2AlCl + Cl_2 \rightarrow EtAlCl_2 + EtCl \qquad IIIA$$

$$EtAlCl_2 + Cl_2 + AlCl_3 + EtCl \qquad IIIB$$

The general procedure for such initiated polymerization is to add the aluminum compound to the monomer feed. The halogen is then added to initiate the polymerization.

By contrast, the catalyst of our novel invention are prepared by prereacting less than a stoichiometric amount of the halogen (halogen acid, etc.) with the organoaluminum compound prior to use for initiating polymerization (Equation I). Demonstrations of the criticality of this requirement are presented in some subsequent examples.

EXAMPLE 3

A polymerization feed containing 380 ml (at −120° C.) isobutylene, 20 ml (at −78° C.) cyclopentadiene and 100 ml (at 20° C.) of methylcyclohexane was used for each experiment. In Run 1 the organoaluminum compound was reacted with the halogen in methylcyclohexane solution (0.063 M in aluminum compound) overnight and used to initiate polymerization the following day. The result is a very active catalyst giving very high catalyst efficiency and very high molecular weight product. Runs 2 and 3 use the same quantities except the halogen is added to the monomer feed followed by the organoaluminum compound in Run 2 and the order of addition is reversed in Run 3. Run 4 uses no halogen only organoaluminum compound.

The results clearly show poor results (low catalyst efficiencies) and low molecular weights when the requirements of this novel invention are not fulfilled. Runs 5 & 6 represent repeats of 3 and 4 using larger quantities of catalyst. Clearly the results are still quite inferior.

These series of experiments demonstrates quite conclusively that the catalysts of this invention are quite different from catalysts which use halogens etc. as the initiators.

TABLE I

EFFECT OF PREREACTING CATALYST ON THE COPOLYMERIZATION OF ISOBUTYLENE WITH 5 VOLUME % CYCLOPENTADIENE, −120° C.

| Run | Mmole $RAlCl_2$ | Mmole $BR_2$ | Order of Addition | Cat. Effic. | $\overline{M}_n$ | $\eta^a$ |
|---|---|---|---|---|---|---|
| 1 | 0.126 | 0.063 | Pretreated | 63,490 | 775,000 | 3.520 |
| 2 | 0.126 | 0.063 | $BR_2$ First | 12,700 | 71,000 | 1.799 |
| 3 | 0.126 | 0.063 | $RAlCl_2$ First | 2,381 | — | 1.747 |
| 4 | 0.126 | None | — | 3,175 | — | 1.901 |
| 5 | 0.252 | 0.063 | $RAlCl_2$ First | 26,365 | 103,000 | 1.986 |

TABLE I-continued
EFFECT OF PREREACTING CATALYST ON THE COPOLYMERIZATION OF ISOBUTYLENE WITH 5 VOLUME % CYCLOPENTADIENE, −120° C.

| Run | Mmole RAlCl$_2$ | Mmole BR$_2$ | Order of Addition | Cat. Effic. | $\overline{M}n$ | $\eta^a$ |
|---|---|---|---|---|---|---|
| 6 | 0.252 | None | — | 27,778 | 119,000 | 2.020 |

$^a$Intrinsic viscosity 1 mg/ml in diisobutylene at 20° C.

EXAMPLE 4

A polymerization feed consisting of 380 ml (at −115° C.) isobutylene 20 ml (at −78° C.) cyclopentadiene and 100 ml methylcyclohexane (at 20° C.) was stirred at −115° C. 2 ml of a catalyst solution prepared by reacting 0.0063 moles isobutylaluminum dichloride with 0.0032 moles bromine chloride (BrCl) in 100 ml methylcyclohexane, to initiate the polymerization. Yield=9.5 g; catalyst efficiency=30,200 g/mole Al; $\overline{M}n$=544,000; 13.9 mole % cyclopentadiene incorporated in copolymer.

Since many modifications and variations of the process of this invention may be made without departing from the spirit of scope thereof, it is not intended to limit the spirit or scope thereof to the specific examples thereof.

What is claimed is:

1. An active catalyst composition which is hydrocarbon soluble consisting of a reaction product produced by mixing:
   (1) material of the formula RAlX$_2$ wherein R is an alkyl radical of straight or branched chain structure of from 1 to 7 carbons and X is the same or different halogen selected from the group consisting of Cl, Br; and
   (2) Y moles of halogen, or mixed halogen per mole of aluminum compound wherein the halogen is selected from the group consisting of Cl and Br such that (1-Y) ranges from less than 0.7 to about 0.2.

2. Composition of claim 1, wherein component (2) is present at about 0.4 to 0.6 moles/mole of component (1).

3. A catalyst composition which is hydrocarbon soluble prepared by a process which consists of mixing to form a reaction product material of the formula RAlX$_2$ wherein R is an alkyl radical of straight or branched chain structure of from 1–7 carbon atoms and X is the same or different halogen selected from the group consisting of Cl and bromine with Y moles of halogen or mixed halogen per mole of aluminum compound wherein the halogen group is selected from the group consisting of Cl and Br such that (1-Y) ranges from less than 0.7 to about 0.2.

4. The composition of claim 3, wherein the components are premixed at least 2 minutes before use.

5. The composition of claim 3, wherein the components are premixed at least 4 hours before use.

6. The composition of claim 3, wherein the components are mixed and allowed to stand overnight before use.

7. The composition of claim 3, wherein the mole ratio of halogen, or mixed halogen to alkyl aluminum dihalide is from 0.4:1 to 0.6:1.

8. The catalyst compositions of claim 1, wherein the catalyst is in solution at a concentration of from 0.01 to 20% in a hydrocarbon solvent.

9. Catalyst compositions of claim 1, wherein the catalyst is soluble in a hydrocarbon solvent thereby forming a solution consisting essentially of a C$_1$-C$_{10}$ paraffinic hydrocarbon or mixture thereof in concentrations between 0.2 and 10%.

10. Catalyst compositions of claim 1, wherein the alkyl radical of component (1) is selected from the group consisting of methyl, ethyl and isobutyl.

11. Catalyst compositions of claim 1, wherein the ratio of bromine to chlorine in the catalyst is 0.0:1 to about 10:1.

12. Catalyst compositions of claim 3, wherein R is selected from the group consisting of methyl, ethyl and isobutyl.

13. Catalyst compositions of claim 12, wherein the catalyst is soluble in a hydrocarbon solvent.

14. Catalyst compositions of claim 12, wherein the hydrocarbon solvent is chosen from the group consisting of C$_1$ to C$_{10}$ paraffins or mixtures thereof.

15. Catalyst compositions of claim 12, wherein the concentrations of catalyst in solution is 0.01 to 20%.

16. Catalyst compositions of claim 12, wherein the concentration of catalyst in solution is between 0.2 and 10%.

17. A process for preparing catalysts which consists of premixing and reacting to form a reaction product, a hydrocarbyl aluminum halide of the formula RAlX$_2$ wherein R is an alkyl radical of straight or branched chain structure of from 1–7 carbon atoms and X is the same or different halogen selected from the group consisting of Cl and Br with Y moles of a reagent per mole of aluminum compound selected from the group consisting of halogen or mixed halogen, wherein the halogen is selected from the group consisting of Cl and Br such that (1-Y) ranges from less than 0.7 to about 0.2.

18. The process of claim 17, wherein the components are premixed at least 2 minutes before use.

19. The process of claim 17, wherein the mole ratio of said halogen to said RAlX$_2$ is from 0.6 to 0.4.

20. The process of claim 17, further characterized in that the reacting and premixing occurs in an inert solvent said formed catalyst composition being soluble in said inert solvent.

21. The process of claim 17, wherein the inert solvent is C$_1$-C$_{10}$ paraffin.

22. The process of claim 17, wherein the alkyl radical is selected from the group consisting of methyl, ethyl or isobutyl.

23. The process of claim 17, wherein the hydrocarbyl aluminum halide is a dihalide.

24. The process of claim 23, wherein the dihalide is dichloride.

25. The process of claim 17, wherein the reagent is Br$_2$ or Cl$_2$.

* * * * *